United States Patent
Brady et al.

(10) Patent No.: US 10,690,548 B2
(45) Date of Patent: Jun. 23, 2020

(54) ENVIRONMENTAL FACTOR ASSESSMENT BY A NON-INTRUSIVE SENSOR IN A FLUID TRANSFER PUMPING SYSTEM

(71) Applicant: INTERNATIONAL BUSINESS MACHINES CORPORATION, Armonk, NY (US)

(72) Inventors: Niall Brady, Donadea (IE); Liam S. Harpur, Skerries (IE); Paulito Palmes, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 479 days.

(21) Appl. No.: 15/689,108

(22) Filed: Aug. 29, 2017

(65) Prior Publication Data
US 2018/0292270 A1 Oct. 11, 2018

Related U.S. Application Data

(63) Continuation-in-part of application No. 15/482,597, filed on Apr. 7, 2017, now Pat. No. 10,041,844.

(51) Int. Cl.
*G01K 1/02* (2006.01)
*G01F 1/704* (2006.01)
(Continued)

(52) U.S. Cl.
CPC .......... *G01K 1/026* (2013.01); *G01F 1/7044* (2013.01); *G01F 15/06* (2013.01); *G01F 15/063* (2013.01);
(Continued)

(58) Field of Classification Search
CPC combination set(s) only.
See application file for complete search history.

(56) References Cited

U.S. PATENT DOCUMENTS

| H001132 H * | 1/1993 | Hellyar ...................... 340/603 |
| 6,550,586 B1 * | 4/2003 | Takeuchi ................ B66B 1/462 187/391 |

(Continued)

FOREIGN PATENT DOCUMENTS

| EP | 2261546 A1 | 12/2010 |
| WO | 2015134715 A2 | 9/2015 |

(Continued)

OTHER PUBLICATIONS

Parry et al., "Operationalising IoT for reverse supply: the development of use-visibility measures," Supply Chain Management: An International Journal, ISSN 1359-8546 [in Press], 2016 (32 pages).
(Continued)

*Primary Examiner* — Travis R Hunnings
(74) *Attorney, Agent, or Firm* — Griffiths & Seaton PLLC

(57) ABSTRACT

Embodiments for assessing energy usage efficiency in a fluid transfer pumping system in a cloud computing environment by a processor. A rate of temperature decay may be determined over a selected time period using a temperature signal collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof.

19 Claims, 8 Drawing Sheets

(51) Int. Cl.
  *G01F 15/06* (2006.01)
  *G06Q 50/06* (2012.01)
  *G06Q 10/10* (2012.01)
  *G01K 3/10* (2006.01)
  *G01F 1/708* (2006.01)

(52) U.S. Cl.
  CPC ............. *G01K 1/022* (2013.01); *G01K 1/024* (2013.01); *G01K 3/10* (2013.01); *G06Q 10/10* (2013.01); *G06Q 50/06* (2013.01); *G01F 1/7084* (2013.01)

(56) References Cited

U.S. PATENT DOCUMENTS

| | | |
|---|---|---|
| 6,779,919 B1 | 8/2004 | Staniforth et al. |
| 6,834,993 B1 | 12/2004 | Staniforth |
| 8,816,865 B1 * | 8/2014 | Deacon .................. G01N 25/60 340/540 |
| 2007/0110121 A1 | 5/2007 | Hsu |
| 2007/0257806 A1 * | 11/2007 | Madden ................. G01N 33/18 340/603 |
| 2011/0303019 A1 * | 12/2011 | Gysling .................. G01F 1/704 73/861.07 |
| 2016/0041015 A1 | 2/2016 | Sheverev et al. |
| 2016/0047694 A1 | 2/2016 | Proctor et al. |
| 2016/0163177 A1 | 6/2016 | Klicpera |
| 2017/0038233 A1 | 2/2017 | Joshi et al. |
| 2017/0168034 A1 | 6/2017 | Fenton |

FOREIGN PATENT DOCUMENTS

| | | |
|---|---|---|
| WO | 2015178904 A1 | 11/2015 |
| WO | 2016032457 A1 | 3/2016 |

OTHER PUBLICATIONS

"Strap-on Temperature Sensor," Electronik, http://downloads.epluse.com/fileadmin/data/product/ee441/ datasheet_EE441.pdf, v. 1.4 (3 pages).

* cited by examiner

ENVIRONMENTAL FACTOR ASSESSMENT BY A NON-INTRUSIVE SENSOR IN A FLUID TRANSFER PUMPING SYSTEM

CROSS REFERENCE TO RELATED APPLICATIONS

This application is a Continuation-in-Part of U.S. patent application Ser. No. 15/482,597 filed on Apr. 7, 2017, the contents of which are incorporated herein.

BACKGROUND OF THE INVENTION

Field of the Invention

The present invention relates in general to computing systems, and more particularly to, various embodiments for cognitively assessing environmental factors relating to energy usage efficiency in a fluid transfer pumping system in a cloud computing environment using a computing processor.

Description of the Related Art

In today's society, various advances in mechanical systems, coupled with advances in computing technology have made possible a wide variety of attendant benefits, such as increasing the efficiency of fluid transfer pumping systems. As computers proliferate throughout aspects of society, additional opportunities continue to present themselves for leveraging technology in fluid transfer pumping systems for improving efficiency of power and energy consumption while minimizing energy footprints.

SUMMARY OF THE INVENTION

Various embodiments for cognitively assessing environmental factors relating to energy usage efficiency in a fluid transfer pumping system in a cloud computing environment by a processor are provided. In one embodiment, by way of example only, a method/system for assessing environmental factors relating to energy usage efficiency in a fluid transfer pumping system using an array of Internet of Things (IoT) sensors in a cloud computing environment is provided. A rate of temperature decay may be determined over a selected time period using a temperature signal collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
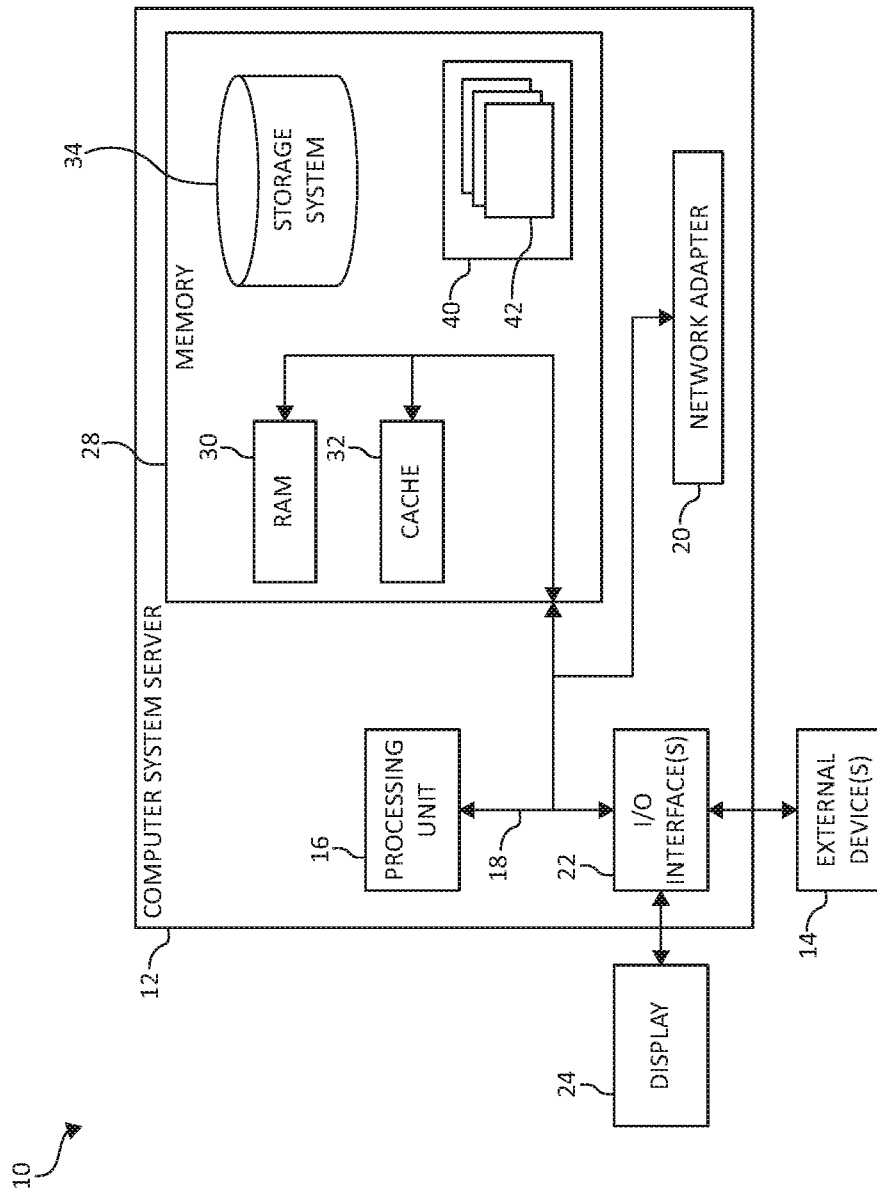
FIG. 1 is a block diagram depicting an exemplary computing node according to an embodiment of the present invention.

A fluid measurement system pertains to the movement of fluid. Flow measurement may be the quantification of fluid movement and may be measured by measuring the velocity of fluid over a known area. As will be described herein, various embodiments provided herein pertain to the flow rate, fluid measurement, and environmental factors associated with fluid transfer pumping systems such as, for example, thermal energy pumped liquid delivery systems, systems that may include high pressure hot water ("HPHW" or steam) systems, low pressure hot water (LPHW) systems, process cooling water, chilled water, refrigeration (high pressure side) systems, or other fluid pumping systems.

Many of these fluid transfer pumping systems are used within various types of buildings such as, for example, commercial buildings. Given the complexity of these fluid transfer pumping systems, it is difficult to establish the quality of insulation relating to large pipe circuits. For example, in these large pipe networks, the linear length of primary pipework in fluid transfer pumping systems may reach up to several kilometers. Thus, establishing an effective ongoing measurement of the quality and effectiveness of pipework insulation (e.g., an environmental factor) is difficult and nearly impossible. Any failure in the insulation, or any insulation incorrectly applied in sections of primary pipework, may lead to undetected energy wastage scenarios. Overtime, these undetected energy wastage scenarios may be significant and detrimental to the health state and energy efficiency of the fluid transfer pumping system, particularly at high external environmental conditions (e.g., cold, winter low ambient temperature environments for heating systems, or high, ambient conditions during the summer for cooling water systems). Such problems also exist in refrigeration systems where the loss of cooling energy results from poor insulation or degrading of insulation over an extended period of time.

As such, a need exists for real-time flow measurement and cognitive environmental factors and energy usage efficiency assessment in a fluid transfer pumping system to enable increased energy savings and efficiency in a pumping system without actually intruding into the system. For example, a need exists for cognitively assessing environmental factors relating to energy usage efficiency in a fluid transfer pumping system in buildings and in systems that are inexpensive, reduce/eliminate any disruption to a system, and address undetected and detected energy wastage opportunities. In this way, the present invention may identify one or more locations of the fluid transfer pumping system having one or more environmental factors that impact the energy efficiency of the fluid transfer pumping system such as, for example, insufficient insulation, degraded insulation, or a combination thereof. Sampled temperature data may be used to determine a rate of temperature decay over a selected time period by one or more non-intrusive Internet of Things ("IoT") sensors located at one or more selected positions of a piping network in the fluid transfer pumping system so as to determine energy efficiency in the fluid transfer pumping system associated with a heating service, a cooling service, or combination thereof.

In one aspect, the present invention pertains to any closed-loop thermal energy system (heating and cooling). The benefits and advantages of the system may include eliminating/reducing the requirement to shut down a system. The present invention enables the system to maintain operation, without a system shutdown and enables sample data from temperature flows of the fluid to be detected by an IoT sensor secured on one or more positions of the closed-loop thermal energy system.

In one aspect, the present invention provides for one or more non-intrusive IoT sensors deployable in a fluid transfer pumping system (including heating and cooling systems) without installation resource support that may operate within a cloud computing environment. The one or more non-intrusive IoT sensors may be selectively and/or strategically positioned on one or more pipes (e.g., connect/strap on to outside of a pipe in a network of piping) in any closed pumped thermal energy pump fluid transfer system (which may include high pressure hot water ("HPHW" or steam) systems, low pressure hot water ("LPHW") systems, process cooling water, chilled water, refrigeration (high pressure side) systems, or other fluid pumping systems). Data may be continuously sampled and may be used to adequately characterize a state (e.g., health state) of a system, determine a rate of temperature decay over a selected time period, or establish one or more acceptable rates of temperature decay to establish acceptable ranges, acceptable energy usage thresholds, and/or energy usage profiles for a particular type of fluid transfer pumping system.

In one aspect, the present invention may deploy a single IoT sensor on a return section (post energy load section) of the piping network, and perform one or more cloud-based, real-time statistical detection operations on a single data point ($T_{sensor}$) and cognitively assess/determine energy usage efficiency by determining a rate of temperature decay. Also, data sampling may occur during a selected period of time (e.g., 24 hours of data sampling and training) and provide for the detection of anomalous system control and demand events (e.g. detecting short cycling events in boilers) of the measured system with no domain expertise involvement. The present invention also negates the need for ancillary data or hardware input requirements.

Additional aspects of the present invention and attendant benefits will be further described, following.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, tablets, and the like).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
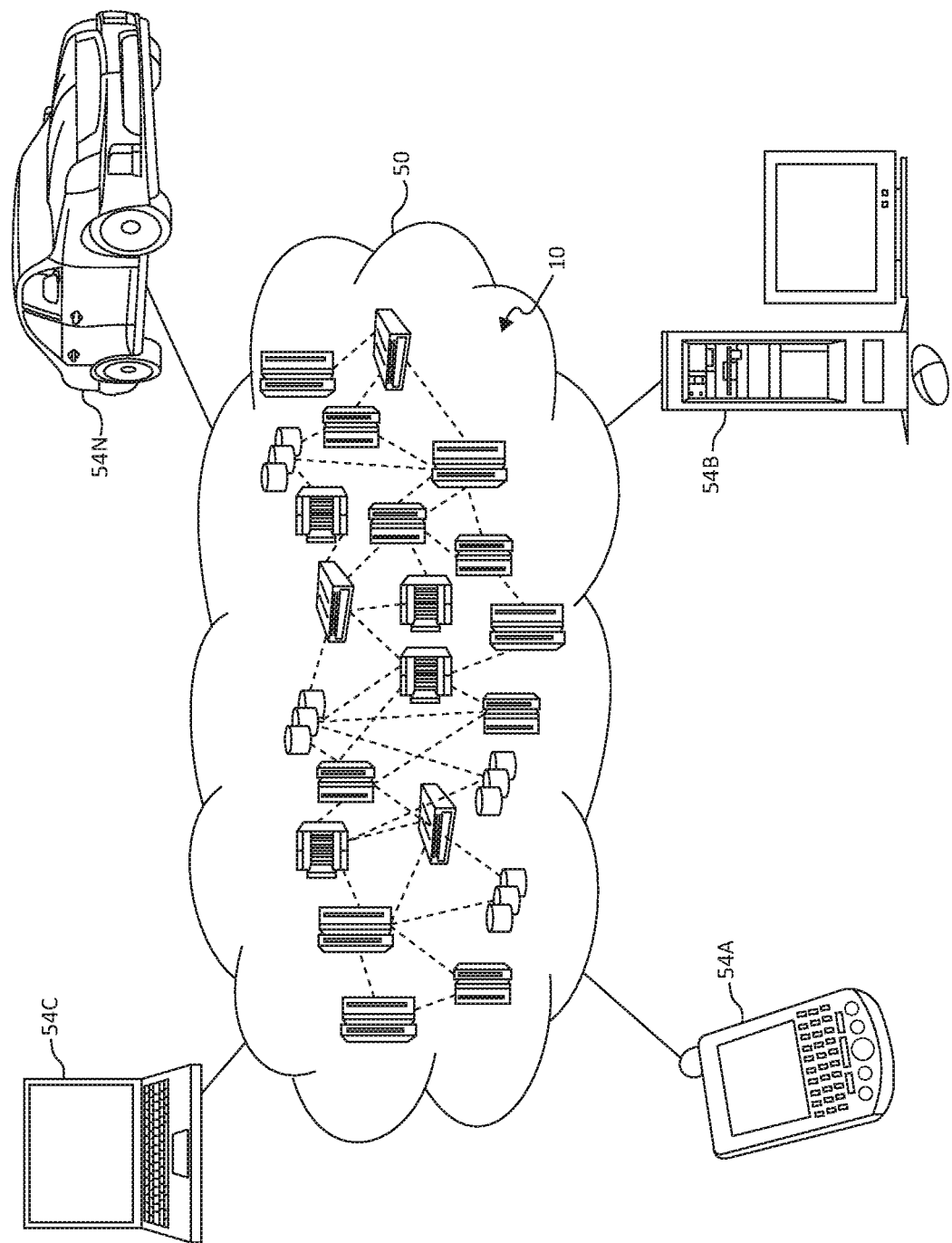
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
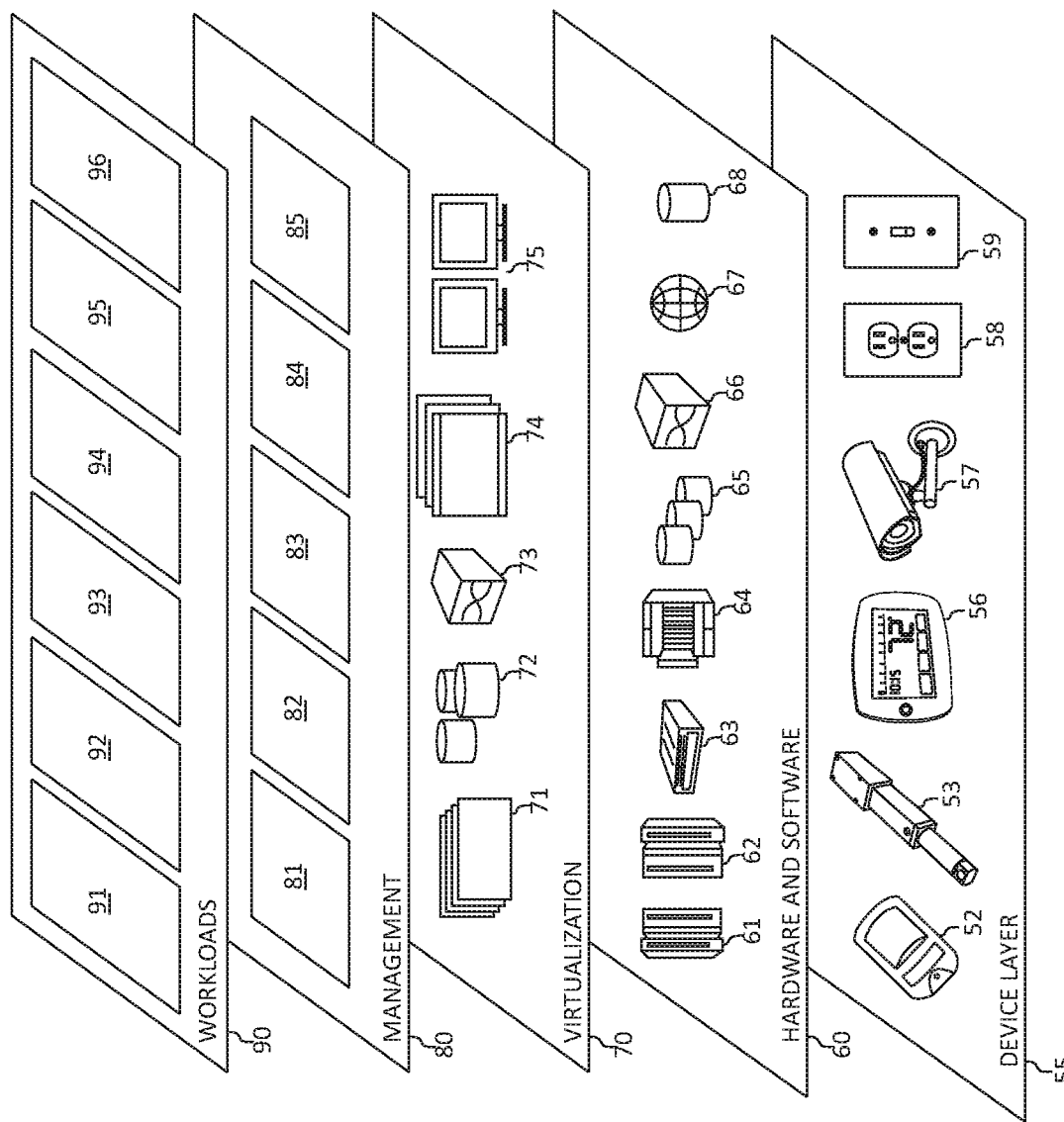
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for cognitive energy usage efficiency assessment in a fluid transfer pumping system using an array of IoT sensors. In addition, workloads and functions 96 for cognitive energy usage efficiency assessment in a fluid transfer pumping system using an array of IoT sensors may include such operations as data analysis (including data collection and processing from various environmental sensors), and predictive data analytics functions. One of ordinary skill in the art will appreciate that the workloads and functions 96 for cognitive energy usage efficiency assessment in a fluid transfer pumping system using an array of IoT sensors may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described herein, the present invention provides for cognitive energy usage efficiency and environmental factor assessment by determining a rate of temperature decay for one or more locations in a fluid transfer pumping system using an array of IoT sensors in a cloud computing environment. In one aspect, an IoT enabled temperature sensor may be coupled (e.g., strapped) to a section of pipe of the fluid transfer pumping system at a selected/known measured distance from a defined starting point, such as, for example, 100 meters distance from the defined starting point, which may be on a return line from a load (e.g., a system load such as a building). One or more IoT sensors may be set to log at high frequency with sampling rates of the order of every 1-2 seconds. Once the system pump is started, at time $t_{start}$, the pump start tracer signal associated with the propagated energy wave is detected at time $t_{stop}$ (e.g., at a time $t_{start}$+p, where p=number of seconds later the tracer signal is detected at S2 (which is further described in Continuation-in-Part of U.S. patent application Ser. No. 15/482,597 filed on Apr. 7, 2017)). A signal may be sent back, via the BMS, at time $t_{stop}$, to stop the pump. Once the pump is stopped, the evaluation phase can begin, at a time defined as $t_0$. A rate of temperature decay may be determined over a selected time period (e.g., $t_{120}$ over a 120 minute (2 hour) period), using a temperature signal collected by one or more non-intrusive Internet of Things (IoT) sensors located at one or more selected positions of a piping network in the fluid transfer pumping system so as to determine energy efficiency of the evaluated pipework section of a fluid transfer pumping system associated with a heating service, a cooling service, or combination thereof.

Figure 4:
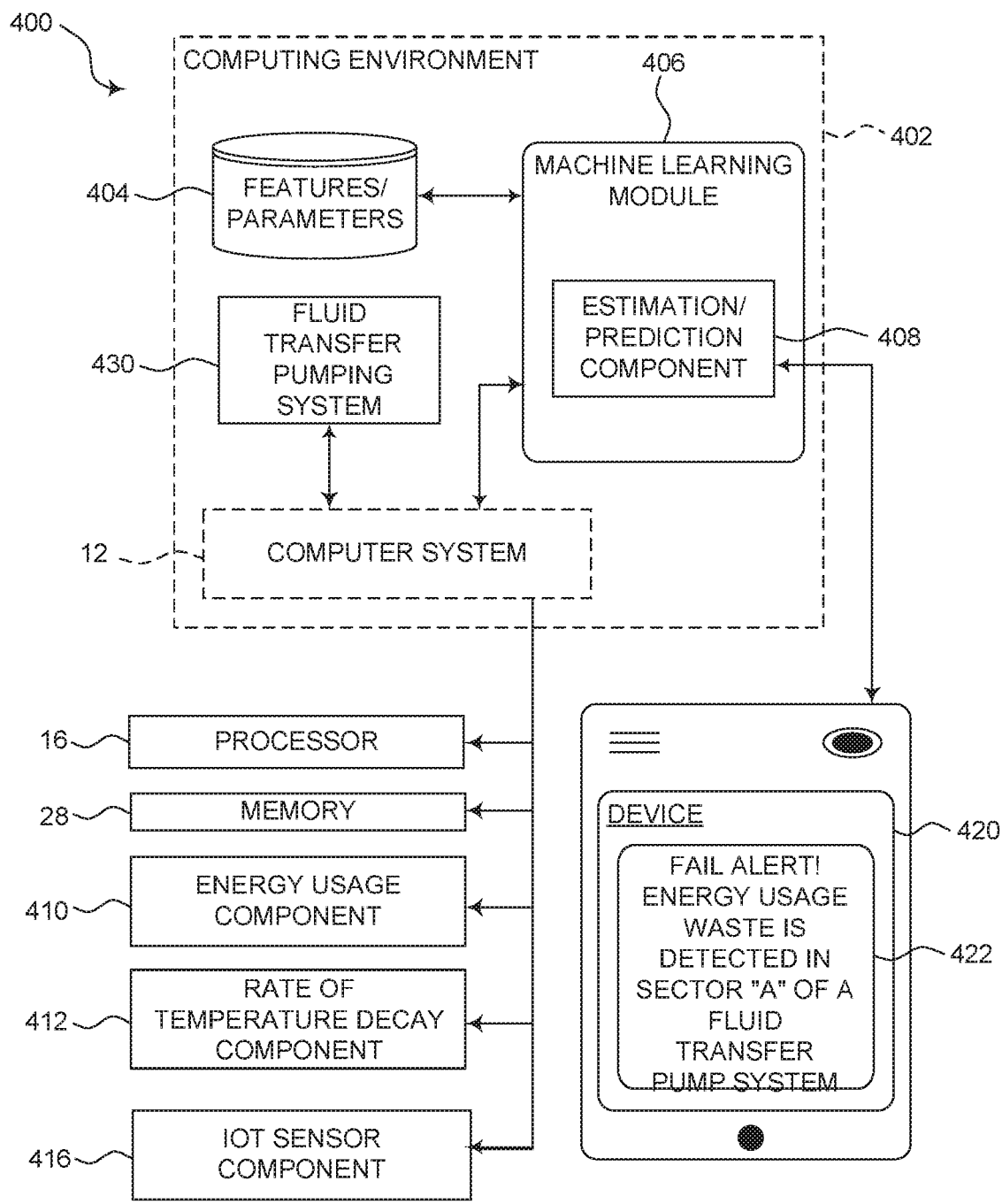
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. FIG. 4 illustrates cognitive energy usage efficiency assessment and training of a machine-learning model in a computing environment, such as a computing environment 402, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for accurate temporal event predictive modeling in accordance with the present invention. Many of the functional blocks 400 may execute as background processes on various components, either in distributed computing components, or on the user device, or elsewhere. Computer system/server 12 is again shown, incorporating processing unit 16 and memory 28 to perform various computational, data processing and other functionality in accordance with various aspects of the present invention.

The system 400 may include the computing environment 402 (e.g., included in a heat exchange system/unit), a fluid transfer pumping system 430, and a device 420, such as a desktop computer, laptop computer, tablet, smart phone, and/or another electronic device that may have one or more processors and memory. The device 420, the fluid transfer pumping system 430, and the computing environment 402 may each be associated with and/or in communication with each other, by one or more communication methods, such as a computing network. In one example, the device 420 and/or the fluid transfer pumping system 430 may be controlled by an owner, customer, or technician/administrator associated with the computing environment 402. In another example, the device 420 and/or the fluid transfer pumping system 430 may be completely independent from the owner, customer, or technician/administrator of the computing environment 402.

In one aspect, the computing environment 402 may provide virtualized computing services (i.e., virtualized computing, virtualized storage, virtualized networking, etc.) to devices 420. More specifically, the computing environment 402 may provide virtualized computing, virtualized storage, virtualized networking and other virtualized services that are executing on a hardware substrate.

As depicted in FIG. 4, the computing environment 402 may include a machine learning module 406, a features and/or parameters 404 that is associated with a machine learning module 406, and the fluid transfer pumping system 430. The features and/or parameters database 404 may also include energy usage profiles for each fluid transfer pumping system 430 and/or IoT sensor devices associated with an IoT sensor component 416. It should be noted that one or more IoT sensor devices may be represented as the IoT sensor component 416 may be coupled to the fluid transfer pumping system 430. The features and/or parameters 404 may be a combination of features, parameters, behavior characteristics, energy usage profile data, temperature data, historical data, tested and validated data, or other specified/defined data for testing, monitoring, validating, detecting, learning, analyzing and/or calculating various conditions or diagnostics relating to cognitively assessing thermal energy in the fluid transfer pumping system 430. That is, different combinations of parameters may be selected and applied to the input data for learning or training one or more machine learning models of the machine learning module 406. The features and/or parameters 404 may define one or more settings of one or more non-intrusive IoT sensors associated with the IoT sensor component 416 to enable the one or more non-intrusive IoT sensors to detect a temperature injection tracer stimuli via the IoT sensor component 416. The one or more non-intrusive IoT sensors associated with the IoT sensor component 416 may be coupled to the fluid transfer pumping system 430 at one or more defined distances from an alternative non-intrusive sensor.

The computing environment 402 may also include a computer system 12, as depicted in FIG. 1. The computer system 12 may also include the energy usage component 410, a rate of temperature decay component 412, and an IoT sensor component 416 each associated with the machine learning module for training and learning one or more machine learning models and also for applying multiple combinations of features, parameters, behavior characteristics, energy usage profiles, fluid flow rate data, temperature data, or a combination thereof to the machine learning model for cognitively assessing thermal energy in a fluid transfer pumping system.

In one aspect, the machine learning module 406 may include an estimation/prediction component 408 for cognitively predicting and/or learning a rate of temperature change according to a tracer stimulus, injected into the fluid transfer pumping system, by one or more IoT sensors associated with the IoT sensor component 416 located at one or more selected positions of a piping network in the fluid transfer pumping system 430. For example, the computer system 12, using the rate of temperature decay component 412, may cognitively determine a rate of temperature decay over a selected time period by one or more IoT sensor(s) components 416. An energy usage profile of the fluid transfer pumping system 430 may be created, defined, stored, and maintained in the machine learning module 406, the features and/or parameters 404, or both.

The machine learning module 406 may collect feedback information from the one or more IoT sensors associated with the IoT sensor component 416 to establish a health state of the fluid transfer pumping system 430 and provide an expected rate of temperature decay (in association with the energy usage component 410). The machine learning module 406 may use the feedback information to provide a cognitive estimate of an energy output/waste of the fluid transfer pumping system 430 using the estimation/prediction component 408. That is, the estimation/prediction component 408 may cognitively estimate the energy usage efficiency using the rate of temperature decay calculated from collected sample data of ($T_{sensor}$) by one or more IoT sensors associated with the IoT sensor component 416. More specifically, the estimation/prediction component 408 may cognitively estimate the energy usage efficiency or insufficiency (which may be directly or indirectly impacted by one or more environmental factors) by comparing a determined rate of temperature decay to an expected rate of temperature decay for the time period between a first timestamp ($t_0$) and a second timestamp ($t_{120}$), during the 120 minute evaluation period. The machine learning module 406 may be initialized using feedback information to learn behavior of a fluid transfer pumping system 430.

The energy usage component 410 may cognitively detect an energy usage efficiency and inefficiency (e.g., energy waste) according to the determined rate of temperature decay by comparing the determined rate of temperature decay with an expected rate of temperature decay. The rate of temperature decay may be determined to be within or outside a defined range of acceptable energy usage values (e.g., acceptable energy usage window). For example, if the determined rate of temperature decay is within acceptable expected rates of temperature decay (e.g., a range of rates of temperature decay), the fluid transfer pumping system 430 may be operating in an energy efficient manner. Alternatively, if the determined rate of temperature decay is not within (e.g., above or below) an acceptable expected rate(s) of temperature decay (e.g., a range of rates of temperature decay), the fluid transfer pumping system 430 may be signaled or indicated to be operating in an energy inefficient manner (e.g., operating less than an expected energy usage standard of threshold). Also, a signal or indication may be provided that one or more environmental factors (e.g., insufficient insulation or degraded insulation) are negatively impacting the energy usage of the fluid transfer pumping system 430.

The device 420 may include a graphical user interface (GUI) 422 enabled to display on the device 420 one or more user interface controls for a user to interact with the GUI 422. For example, the GUI 422 may display an energy output or determined rate of temperature decay to a user via an interactive graphical user interface (GUI) according to the cognitive estimate of an energy output of the fluid transfer pumping system. For example, the energy output or determined rate of temperature decay may be an alert that indicates or displays audibly and/or visually on the GUI 422 "FAIL ALERT! Energy usage waste is detected in sector "A" of a fluid transfer pumping system."

In one aspect, the cognitive energy usage efficiency assessment in a fluid transfer pumping system and estimation/predictive modeling (or machine learning modeling), as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environement (e.g., external to the controlled, testing environment), the computing devices may be monitored for compliance.

In one aspect, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
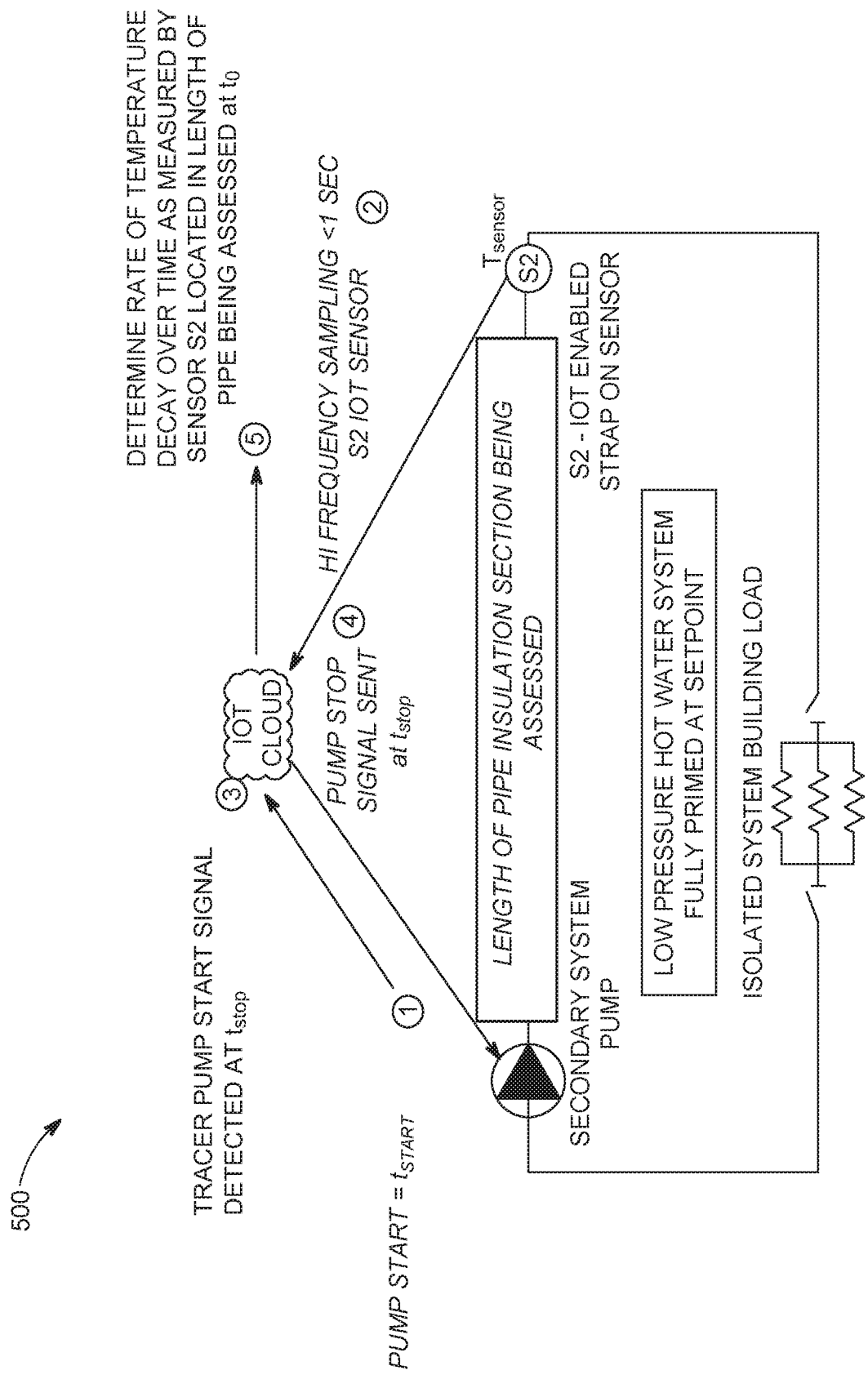
FIG. 5 is a block flow diagram of an exemplary method for cognitively assessing energy in a fluid transfer pumping system by a processor, in which various aspects of the present invention may be realized.

FIG. 5 is a block flow diagram 500 of cognitive energy usage efficiency assessment in a fluid transfer pumping system in an Internet of Things (IoT) computing network. As shown, the various functionality is depicted with arrows designating the flow diagrams 500's relationships with each other and to show process flow. Additionally, descriptive information is also seen relating to the functional flow diagram 500. As will be seen, many of the functional aspects may also be considered "modules", "components", or "devices" of functionality, in the same descriptive sense as has been previously described in FIGS. 1-5. With the foregoing in mind, various aspects of flow diagram 500 may be incorporated into various hardware and software components of a system for cognitive energy usage efficiency assessment in a fluid transfer pumping system in a cloud computing environment with the present invention. Many of the functional aspects of flow diagram 500 may execute as background processes on various components, either in distributed computing components, or on the user device, or elsewhere, and generally unaware to the user performing generalized tasks for cognitively assessing energy in a fluid transfer pumping system in a cloud computing environment.

The flow diagram 500 may include a system pump (e.g., a secondary system pump) and an IoT sensor ("S2") connected to a load (e.g., a fluid transfer pumping system such as, for example, a low pressure hot water (LPHW) system in a building). The IoT sensor S2 (e.g., IoT enabled temperature sensor S2) may be coupled (e.g., strapped) to a pipe (e.g., a return line) such as, for example, an outside portion of selected pipe section of a target pipe so as to measure the flow temperature at a selected/measured distance (e.g., greater than 100 meters) from the system pump. The IoT sensor S2 may be set at high frequency low delta logging mode to accurately detect the flow temperature (which may be a tracer signal) detected at the timestamp ($t_{stop}$). A predefined adjustable tracer input signal may be implemented at a timestamp $t_{start}$ that may be monitored through the system pump such as, for example, the secondary system pump measuring an appropriate injection start signal (e.g., building management system ("BMS") "enable" signal), a peak current from an energy meter, or a VSD frequency so as to accurately capture the timestamp of the injection tracer input signal, injected at timestamp ($t_{start}$). That is, at step 1, the pump start signal timestamp may be equal to ($t_{start}$) and the timestamp at which the tracer pump start signal (e.g., the injection start signal) is detected to stop may be equal to ($t_{stop}$).

For example, at step 1, the system pump may be turned on or started with the start signal timestamp equal to ($t_{start}$). At step 2, the IoT sensor S2 operating at a high frequency, continuously samples temperature data at a frequency of less than 1 second (e.g., samples data at time intervals that are less than one second). In step 3, the tracer pump start signal is detected at a timestamp ($t_{stop}$). At step 4, the pump stop signal is sent to stop the pump from injecting any further thermal energy into the pipe area under assessment. At step 5, at a timestamp $t_0$, defined as the start of the evaluation period, a rate of temperature decay is determined over time to apply one or more analytical operations for determining energy usage efficiency, inefficiency, or determining one or more locations requiring additional or new pipe insulation.

It should be noted the various temperature readings from the IoT sensor S2 may be dynamically communicated to an IoT communication network (e.g., IoT cloud) so as to apply appropriate temperature signal detection operations running in an analytics layer of an IoT computing system so that an accurate temperature of the fluid can be established. The accuracy of the sensing can be improved over time as additional detection events are created and detection operations are fine-tuned and/or learned using a machine learning mechanism. From applying one or more determination/calculation operations in the 120 minute evaluation period, from these two timestamps (e.g., timestamp ($t_0$) and timestamp ($t_{120}$)) along with a distance measurement taken, if desired or selected, between the system pump and the IoT sensor S2, a pass/fail alert indicating energy usage efficiency or inefficiency may be provided according to a determined rate of temperature decay compared with stored, known, or established rates of temperature decay standards, such as, for example, to an interactive graphical user interface ("GUI") of an internet-based computing system.

Consider the following example by assuming a boiler and pump (of a fluid transfer pumping system in an IoT computing network) are turned off for an extended time (at least for a full day) during a commissioning phase or at one or more maintenance periods. Thereafter, the pipe fluid eventually assumes the temperature of the surrounding environment while the pump is in the turn off period. A nonintrusive IoT temperature sensor may be attached to one or more specific points on the pipe work of the fluid transfer pumping system. The fluid transfer pumping system may be brought up to standardized/defined temperature (which may be after a weekend). In one aspect, each of the pipe circuit loads (assume there can be no load components scheduled during the test) may be isolated. A secondary pumping system may be initiated where hot water, at a defined or selected point, may be pumped from the pump header, which may set a tracer start flag at a timestamp $t_{start}$. One or more IoT sensors (e.g., S2 of FIG. 5) may continually monitor and sample temperature data at a high frequency rate (e.g., less than 1 second) until the first IoT sensor identifies the propagated energy wave start pump tracer start flag at timestamp $t_{start+p}$ where p is the number of seconds later the tracer signal is detected at the relevant IoT sensor. Once the pump start tracer flag has been detected by the one or more IoT sensors, the system pump may be shut off, which marks the beginning of the evaluation period.

At start of the evaluation period at $t_0$, one or more defined or selected cloud-based analytics operations may be used that may determine and calculate an actual rate of energy decay within the assessed insulated piping section. The calculated rate of temperature decay may be compared against an expected rate of decay based on pipe dimensions, pipe material, fluid density, and ambient temperature, one or more IoT sensors, or a combination thereof to determine if there are any insulation inefficiencies (e.g., escaping heat or cool air via tears, gaps, or removed insulation) or degradation over time. A pass/fail alert may be generated from the system based on the applied analytics operations.

In one aspect, the cognitive energy usage efficiency assessment may include determining the pipe insulation efficiency (or inefficiency). The pipe insulation efficiency may be determined by comparing the determined rate of temperature decay with an expected rate of temperature decay (e.g., a theoretical rate of decay). For example, an observed rate of decay per minute may be determined by equation 1:

$$\text{Observed Rate of Decay Per Minute} = T\text{sensor}_{t_{n+1}} - T\text{sensor}_{t_n} \quad (1),$$

where Tsensor is the temperature ("T") of the S2 IoT sensor, and to and tn+1 may be consecutive minutes post evaluation start time $t_0$ where "t" is time and "T" is temperature. The theoretical rate of decay may be determined from a variety of sources such as, for example, one or more heat loss calculators (e.g., online heat loss calculators) where it is possible to establish a theoretical heat loss of a section of insulated pipe, by inputting pipe and insulation material conductivities, along with pipe and insulation thickness values, and estimates of likely operational temperature differences ("ΔT") between the insulation surface of the pipe and the ambient air temperatures. Heat loss or gain may take place from a pipe carrying fluid that is hotter or colder than ambient temperature. Thus, if the observed temperature rate of decay is greater than the theoretical temperature rate of decay, an issue or problem of the assessed pipe region is determined. Thus, the pass/fail alert may be generated.

Figure 6:
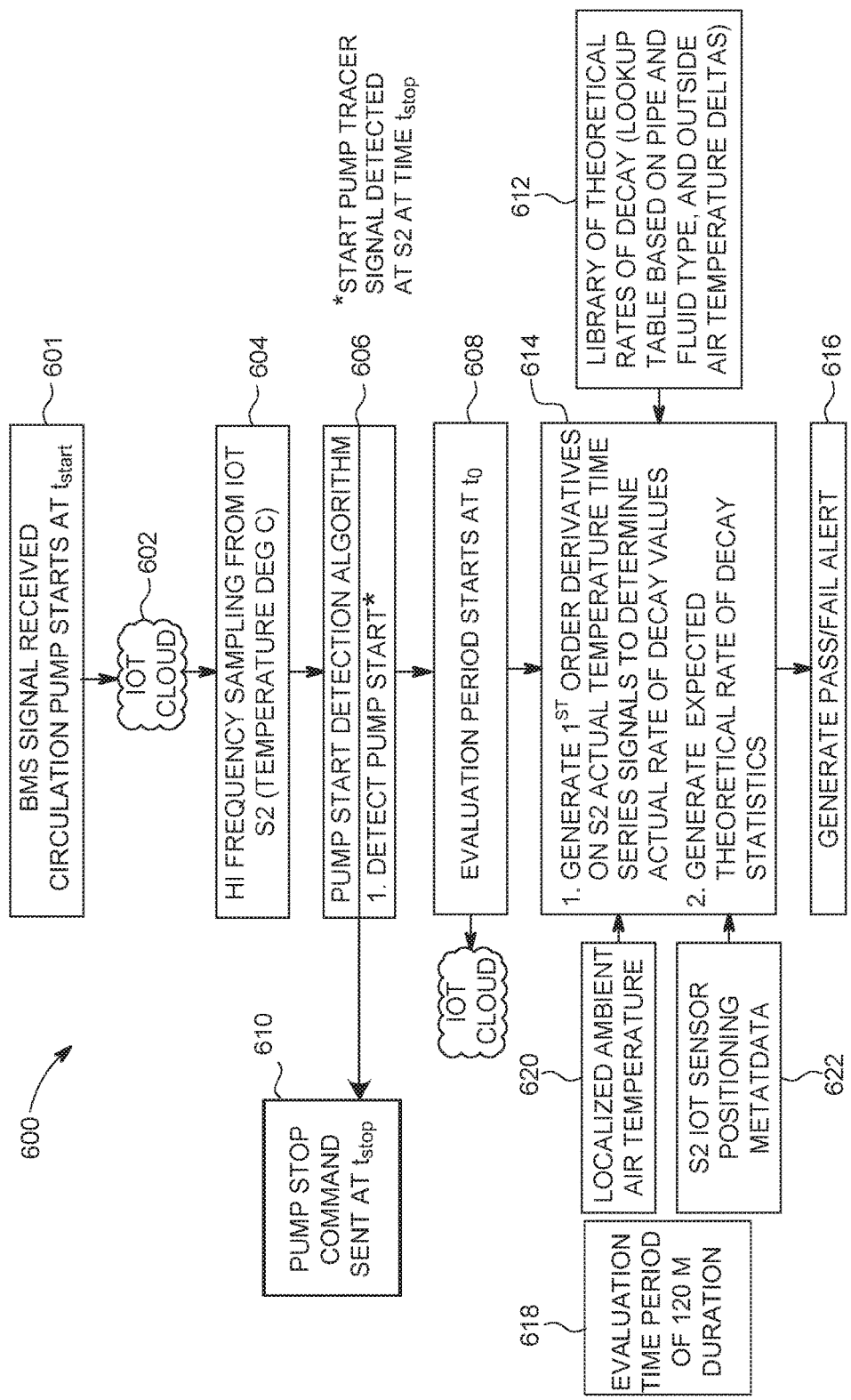
FIG. 6 is a block flow diagram of cognitive energy usage efficiency assessment in a fluid transfer pumping system in an Internet of Things (IoT) computing network in accordance with aspects of the present invention.

Turning now to FIG. 6, a block flow diagram 600 depicts cognitive energy usage efficiency assessment in a fluid transfer pumping system in an Internet of Things (IoT) computing network upon injecting a tracer stimuli in a fluid transfer pumping system. The functionality 600 may be implemented as a method executed as instructions on a machine, where the instructions are included on at least one computer readable medium or one non-transitory machine-readable storage medium. The functionality 600 may start in block 601, with the pump start signal being received from a building management system ("BMS") and initiating high frequency sampling from an IoT sensor (such as $T_{sensor}$ from IoT sensor "S2" of FIG. 5) to collect temperature data (the temperature being measured in degrees Celsius), as in block 604. The collected and sampled data may be stored in or retrieved from an IoT cloud computing environment 602. A system pump detection operation may be performed to detect pump start tracer signal, as in block 606, at timestamp ($t_{stop}$), which will equate to a time $t_{start}+p$, where p is the number of seconds after the pump start tracer signal has been detected at sensor S2. At timestamp ($t_{stop}$), a pump stop signal is sent through to the BMS to turn off the pump, to prevent any further energy injection into the pipework, as in block 610, and the evaluation period for determining the rate of temperature decay may begin (e.g., the evaluation period starts at $t_0$), as in block 608.

The cognitive energy usage efficiency assessment operations may include 1) generating first order derivatives on IoT sensor ("S2") actual temperature time series signals to determine an actual rate of temperature decay values, and 2) generating an expected ("theoretical") rate of temperature decay statistical summary, as in block 614. A designated time period 618, $t_{120}$ (e.g., $t_{o_0}$+two hours), localized ambient air temperature 620, and one or more IoT sensors' (such as IoT sensor "S2" of FIG. 5) positioning metadata 622 may be used for performing the cognitive energy usage efficiency assessment operations. In one aspect, the positioning metadata 622 may be used to identify the position or location (e.g., geolocation) of the sensor S2 or area under testing, time of test, or a variety of other information. A library/knowledge domain 612 of theoretical rates of temperature decay may be used (e.g., a lookup table may be accessed and used based on a pipe, type of fluid, and outside air temperature changes (e.g., "ΔT" or change in temperature)). A pass or fail alert may be generated, as in block 616.

Figure 7:
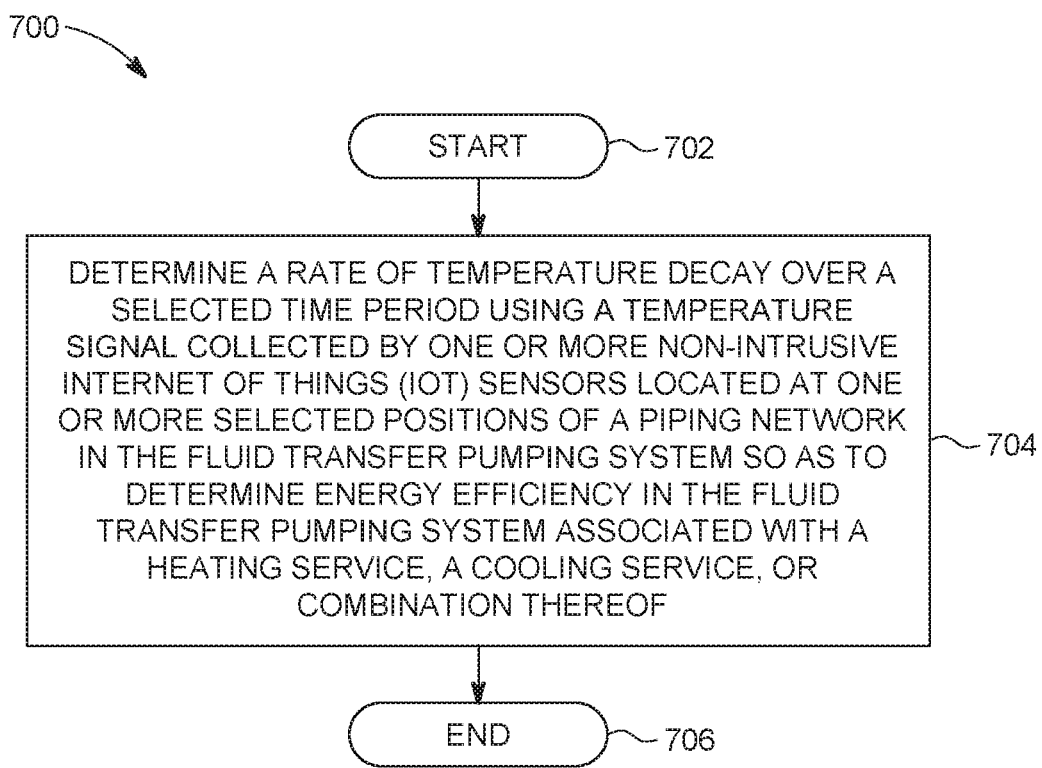
FIG. 7 is a flowchart diagram of an exemplary method for cognitive energy usage efficiency assessment in a fluid transfer pumping system in an Internet of Things (IoT) computing network in accordance with aspects of the present invention.

FIG. 7 is a method 700 for cognitive energy usage efficiency assessment in a fluid transfer pumping system in an IoT computing network, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702. A rate of temperature decay (or multiple rates of temperature decay for one or more locations) may be determined over a selected time period using a temperature signal (e.g., collected temperature data of the fluid) collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof, as in block, 704. The functionality 700 may end in block 706.

Figure 8:
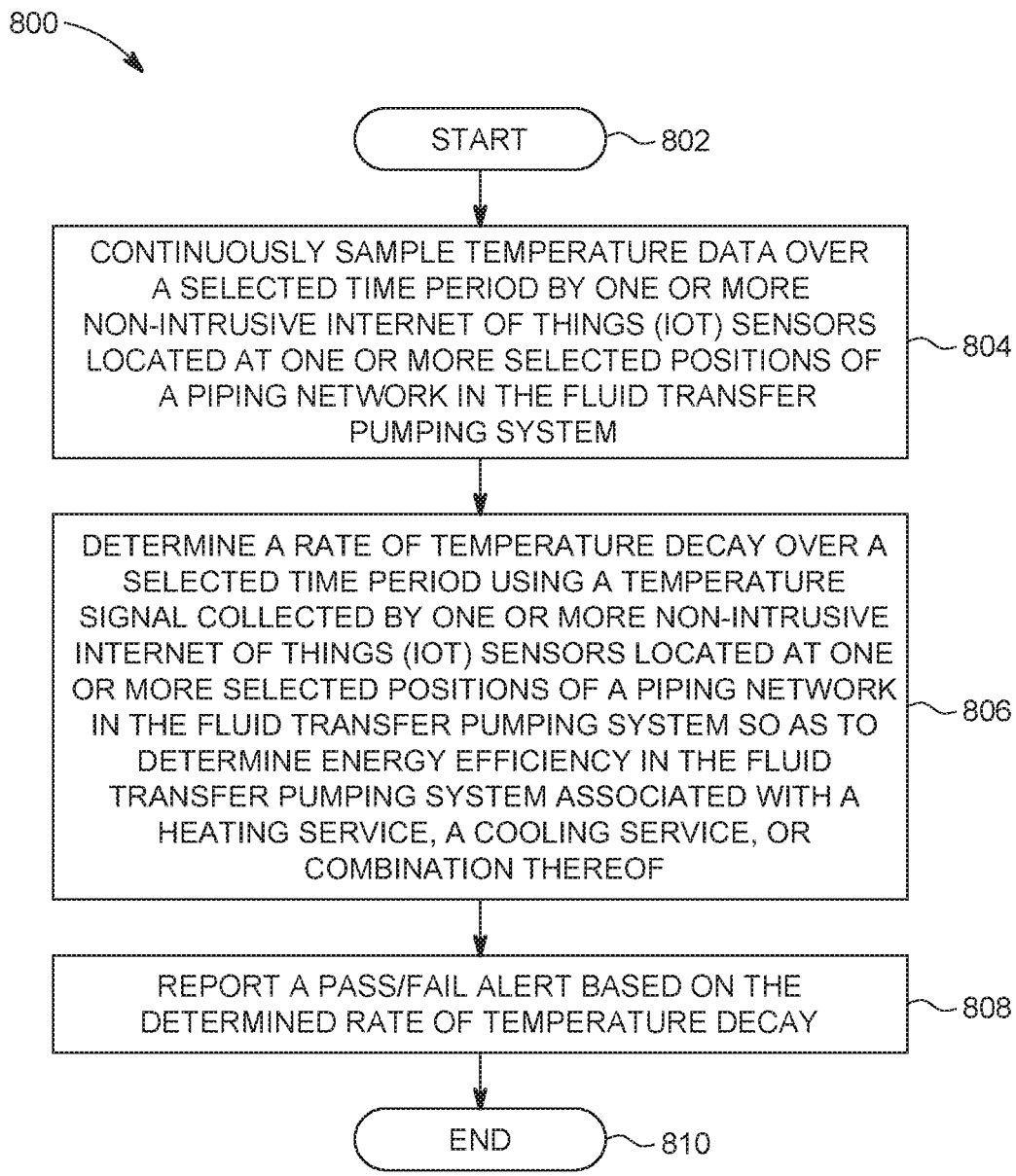
FIG. 8 is a flowchart diagram of an exemplary method for cognitive energy usage efficiency assessment in a fluid transfer pumping system in an Internet of Things (IoT) computing network in accordance with aspects of the present invention.

FIG. 8 is a method 800 for cognitive energy usage efficiency assessment in a fluid transfer pumping system in an IoT computing network, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802. Temperature data may be continuously sampled (and collected) over a selected time period by one or more non-intrusive IoT sensors located at one or more selected positions of a piping network in the fluid transfer pumping system, as in block 804. A rate of temperature decay (or multiple rates of temperature decay for one or more locations) may be determined over a selected time period using a temperature signal (e.g., collected temperature data of the fluid) collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof, as in block 806. A pass/fail alert (relating to the energy usage efficiency such as, for example, a fail alert indicating energy waste detected at a location) may be reported based on the determined rate of temperature decay, as in block 808. The functionality 800 may end in block 810.

In one aspect, in conjunction with and/or as part of at least one block of FIGS. 7 and 8, the operations of methods 700 and 800 may include each of the following. The operations of methods 700 and 800 may include continuously sampling temperature data over the selected time period by the one or more non-intrusive IoT sensors, comparing the determined rate of temperature decay with an expected rate of temperature decay. The rate of temperature decay may be determined to be above or below a defined energy efficiency threshold based on comparing the determined rate of temperature decay with an expected rate of temperature decay. Also, the rate of temperature decay may be determined to be within or outside of a defined range of acceptable energy usage values (e.g., acceptable energy usage window).

The operations of methods 700 and 800 may include generating an alert indicating energy waste upon the rate of temperature decay being above a defined energy efficiency threshold, or generating an alert indicating acceptable energy usage upon the rate of temperature decay being below a defined energy efficiency threshold. Also, one or more locations in the piping network may be identified and located as having energy waste according to the rate of temperature decay determined from sampled temperature data at the one or more locations. The energy usage output and/or the rate of temperature decay may be provided to a user via an interactive graphical user interface (GUI) for one or more locations in the piping network.

The operations of methods 700 and 800 may include detecting a tracer stimulus in the fluid transfer pumping system at a selected location and at a selected time period, by one or more IoT sensors located on one or more pipes of a fluid return section of the piping network in the fluid transfer pumping system. The one or more IoT sensors may be in an IoT computing network.

The operations of methods 700 and 800 may include cognitively estimating the fluid flow rate according to the detected tracer stimulus based on a first timestamp and a second timestamp. A series of rules and parameters may be implemented for injecting the tracer stimulus into the fluid transfer pumping system and setting one or more parameters of the IoT sensors, wherein the IoT sensors are non-intrusive in the fluid transfer pumping system and the tracer stimulus is an adjustable tracer stimuli. Feedback information may be collected from the IoT sensors to establish a health state of the fluid transfer pumping system and detect one or more anomalous fluid transfer pumping system events. A machine learning mechanism may be implemented using the feedback information to provide a cognitive estimate of an energy output of the fluid transfer pumping system.

The operations of methods 700 and 800 may include defining one or more settings of one or more non-intrusive IoT sensors to enable the one or more non-intrusive IoT sensors to detect a temperature data of the fluid. The one or more non-intrusive IoT sensors may be coupled to the fluid transfer pumping system at one or more defined distances from an alternative non-intrusive sensor. A temperature injection tracer stimuli or the temperature of the fluid itself, may be detected and collected by one or more non-intrusive IoT sensors. The non-intrusive sensor may measure a start time of the temperature injection tracer stimuli or the temperature of the fluid itself. The one or more non-intrusive IoT sensors detects an arrival time of the temperature injection tracer stimuli or the temperature of the fluid itself.

One or more energy usage standards may be defined in a knowledge domain for testing and validating the energy usage anomalies/waste in the fluid transfer pumping system. A machine learning mechanism may be initialized using feedback information to learn behavior of the fluid transfer pumping system, an energy usage profile, and behavior patterns of the fluid transfer pumping system. The fluid transfer pumping system may be in an Internet of Things (IoT) computing network.

In summary, the present invention provides for non-intrusive temperature sensing capabilities in a selected region of interest of a thermal fluid transfer pipe network/system. The present invention provides for non-intrusive temperature sensing capabilities that may use 1) a static technology operation (e.g., a strap on a pipe temperature sensor) with sensor locations determined through application of a variety of available sensor positioning coverage optimization operations and 2) dynamic and remotely deployable temperature sensing technologies (e.g., infrared "IR" cameras that may also be mounted to a drone(s)) to provide continuous sampling of temperature data that may be backhauled to a cloud computing environment using one or more network resources.

In one aspect, a pass/fail quantitative decision alert may be provided from the system relating to an acceptable configurable quality level of the pipe insulation in the targeted test pipe area. For example, in a building commissioning mode, the pipework system commissioning process may be augmented and generate a pass/fail quantitative decision alert from the system relating to the acceptable configurable quality level of the pipe insulation in selected parts of a pipe network during unit testing in commissioning in order to quickly identify localized insulation installation problems. In conjunction with available pipework and building drawings, the present invention may pinpoint specific energy loss problems in areas of pipework that are not accessible for testing or visual inspection by leaving the static temperature sensors in a current location (e.g., "in situ") to enable ongoing assessment of insulation quality in the region of interest, and by helping to analyze rates of degradation over a selected period of time. The point in time for insulation replacement may be predicted based on data driven cost benefit analysis using the application of the technology described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for assessing energy usage efficiency in a fluid transfer pumping system in a cloud computing environment by a processor, comprising:
determining a rate of temperature decay over a selected time period using a temperature signal collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof.

2. The method of claim 1, further including continuously sampling temperature data over the selected time period by the one or more non-intrusive IoT sensors, wherein the one or more non-intrusive IoT sensors are in an IoT computing network.

3. The method of claim 1, further including comparing the determined rate of temperature decay with an expected rate of temperature decay.

4. The method of claim 1, further including determining the rate of temperature decay is above or below a defined energy efficiency threshold based on comparing the determined rate of temperature decay with an expected rate of temperature decay.

5. The method of claim 1, further including:
generating an alert indicating energy waste upon the rate of temperature decay being above a defined energy efficiency threshold; or
generating an alert indicating acceptable energy usage upon the rate of temperature decay being below a defined energy efficiency threshold.

6. The method of claim 1, further including identifying one or more locations in the piping network having energy waste according to the rate of temperature decay determined from sampled temperature data at the one or more locations.

7. The method of claim 1, further including providing the energy output or the rate of temperature decay to a user via an interactive graphical user interface (GUI) for one or more locations in the piping network, wherein the one or more non-intrusive IoT sensors include at least an infra-red camera.

8. A system for assessing energy usage efficiency in a fluid transfer pumping system in a cloud computing environment, comprising:
one or more computers with executable instructions that when executed cause the system to:
determine a rate of temperature decay over a selected time period using a temperature signal collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof.

9. The system of claim 8, wherein the executable instructions further continuously sample temperature data over the selected time period by the one or more non-intrusive IoT sensors, wherein the one or more non-intrusive IoT sensors are in an IoT computing network.

10. The system of claim 8, wherein the executable instructions further compare the determined rate of temperature decay with an expected rate of temperature decay.

11. The system of claim 8, wherein the executable instructions further determine the rate of temperature decay is above or below a defined energy efficiency threshold based on comparing the determined rate of temperature decay with an expected rate of temperature decay.

12. The system of claim 8, wherein the executable instructions further:
generate an alert indicating energy waste upon the rate of temperature decay being above a defined energy efficiency threshold; or
generate an alert indicating acceptable energy usage upon the rate of temperature decay being below a defined energy efficiency threshold.

13. The system of claim 8, wherein the executable instructions further:
identify one or more locations in the piping network having energy waste according to the rate of temperature decay determined from sampled temperature data at the one or more locations, wherein the one or more non-intrusive IoT sensors include at least an infra-red camera; and
provide the energy output or the rate of temperature decay to a user via an interactive graphical user interface (GUI).

14. A computer program product for energy usage efficiency in a fluid transfer pumping system in a cloud computing environment by a processor, the computer program product comprising a non-transitory computer-readable storage medium having computer-readable program code portions stored therein, the computer-readable program code portions comprising:
an executable portion that determines a rate of temperature decay over a selected time period using a temperature signal collected by one or more non-intrusive Internet of Things (IoT) sensors located at one or more selected positions of a piping network in the fluid transfer pumping system so as to determine energy efficiency in the fluid transfer pumping system associated with a heating service, a cooling service, or combination thereof.

15. The computer program product of claim 14, further including an executable portion that continuously samples temperature data over the selected time period by the one or more non-intrusive IoT sensors, wherein the one or more non-intrusive IoT sensors are in an IoT computing network.

16. The computer program product of claim 14, further including an executable portion that compares the determined rate of temperature decay with an expected rate of temperature decay.

17. The computer program product of claim 14, further including an executable portion that determines the rate of temperature decay is above or below a defined energy efficiency threshold based on comparing the determined rate of temperature decay with an expected rate of temperature decay.

18. The computer program product of claim 14, further including an executable portion that:
generates an alert indicating energy waste upon the rate of temperature decay being above a defined energy efficiency threshold; or
generates an alert indicating acceptable energy usage upon the rate of temperature decay being below a defined energy efficiency threshold.

19. The computer program product of claim 14, further including an executable portion that:
identifies one or more locations in the piping network having energy waste according to the rate of temperature decay determined from sampled temperature data at the one or more locations, wherein the one or more non-intrusive IoT sensors include at least an infra-red camera; and
provides the energy output or the rate of temperature decay to a user via an interactive graphical user interface (GUI) for the one or more locations in the piping network.

* * * * *